United States Patent Office 3,754,087
Patented Aug. 21, 1973

3,754,087
2 - HALOMETHYL - 3 - CARBOXYLIC ACID-AMIDO-QUINOXALINE - 1,4-DI-N-OXIDES AS ANTIBACTERIAL AGENTS AND PHARMACEUTICAL COMPOSITIONS COMPRISING SAID OXIDES
Kurt Ley, Odenthal-Globusch, Ulrich Kholzer, Cologne-Stammheim, Roland Nast, Cologne-Buchheim, Karl Georg Metzger, Wuppertal-Elberfeld, and Dieter Fritsche, Wuppertal-Vohwinkel, Germany, assignors to Farbenfabriken Bayer Aktiengesellschaft
No Drawing. Original application Oct. 2, 1968, Ser. No. 764,610, now Patent No. 3,557,109, dated Jan. 19, 1971. Divided and this application Nov. 12, 1969, Ser. No. 871,269
Claims priority, application Germany, Oct. 4, 1967, F 53,667
Int. Cl. A61k 27/00
U.S. Cl. 424—250                           39 Claims

ABSTRACT OF THE DISCLOSURE 2-halomethyl-3-carboxylic acid-amido-quinoxaline-1,4-di-N-oxides of the formula:

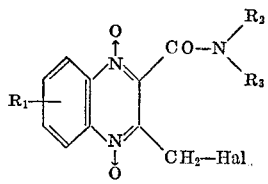

wherein:
$R_1$ is hydrogen, lower alkyl, lower alkoxy or chlorine,
$R_2$ is hydrogen, straight or branched chain alkyl or straight or branched chain alkyl substituted by hydroxy, lower alkoxy, acyloxy, monoalkylamino or dialkylamino,
$R_3$ is hydrogen, straight or branched chain alkyl, straight or branched chain alkyl substituted by hydroxy, lower alkoxy, acyloxy, monoalkylamino or dialkylamino, or when $R_2$ is hydrogen, cyclohexyl, or $R_2$ and $R_3$ together with the amide nitrogen atom form part of a 5- or 6-membered heterocyclic ring, and Hal is chlorine or bromine, in combination with a pharmaceutically acceptable inert carrier are useful for their antibacterial effect.

These compositions or the active compound can be administered subcutaneously or orally to humans or animals.

---

This is a division of our co-pending application Ser. No. 764,610, filed Oct. 2, 1968, now U.S. Pat. 3,557,109.

The present invention is concerned with 2-halomethyl-3-carboxylic acid-amido-quinoxaline-1,4-di-N-oxides and their production. More particularly, these compounds can be represented by the formula:

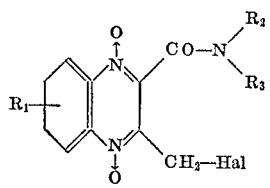

wherein:
$R_1$ is hydrogen, lower alkyl, lower alkoxy or chlorine,
$R_2$ is hydrogen, straight or branched chain alkyl or straight or branched chain alkyl substituted by hydroxy, lower alkoxy, acyloxy, monoalkylamino or dialkylamino, $R_3$ is hydrogen, straight or branched chain alkyl, straight or branched chain alkyl substituted by hydroxy, lower alkoxy, acyloxy, monoalkylamino or dialkylamino, or when $R_2$ is hydrogen, cyclohexyl, or $R_2$ and $R_3$ together with the amide nitrogen atom form part of a 5- or 6-membered heterocyclic ring, and Hal is chlorine or bromine.

These compounds are useful as antibacterial compounds.

The compounds of the present invention may be produced, inter alia, by halogenating a 2-methyl-3-carboxylic acid amido-quinoxaline-1,4-di-N-oxide of the formula:

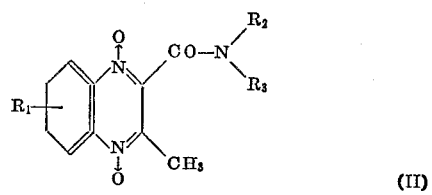

in a suitable organic solvent at a temperature of from about 20° C. to about 120° C.

According to the present invention, the preferred lower alkyl and lower alkoxy groups for $R_1$ are those containing 1 to 4 carbon atoms. When $R_2$ and $R_3$ are alkyl, it is preferred that the alkyl moieties contain 1 to 12 carbon atoms. Particularly preferred embodiments are those wherein the alkyl groups contain from 1 to 6 carbon atoms. When the alkyl moieties of $R_2$ and $R_3$ are substituted by lower alkoxy, acyloxy, mono- or dialkylamino moieties, it is preferred that the alkyl portions of those moieties contain from 1 to 4 carbon atoms. In the case of the dialkylamino moieties, each alkyl group is preferred to contain 1 to 4 carbon atoms. Where $R_2$ and $R_3$ together with the amide nitrogen atom form a part of a heterocyclic ring, such a ring may contain, besides the amide nitrogen atom, an additional nitrogen atom or an oxygen heteroatom. When $R_2$ and $R_3$ form a 6-membered ring containing 2 heteroatoms, the second heteroatom is preferably in the para position to the amide nitrogen atom and the hydrogen atom may be substituted on the additional nitrogen atom if nitrogen is the second heteroatom by lower alkyl of 1 to 4 carbon atoms which, in turn, may itself be substituted by hydroxy, methoxy or acetoxy.

If 2-methyl-3-carboxylic acid methylamido-quinoxaline-1,4-di-N-oxide and chlorine are used as starting materials, the reaction of the invention can be represented by the following reaction mechanism:

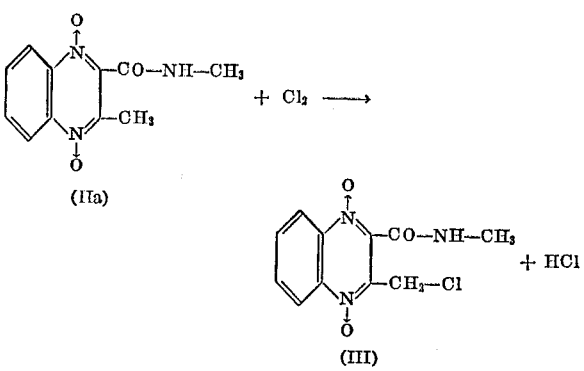

The 2-methyl-3-carboxylic acid amido-quinoxaline-1,4-di-N-oxides of Formula II may be obtained by reaction of benzofuroxanes and acetoacetic acid amides or acetoacetic acid phenyl ester with ammonia or primary amines. German application F53665 IVd/12p filed Oct. 4, 1967 and corresponding United States application filed concurrently herewith and designated Lo A 11052–A Ser. No. 764,611 filed Oct. 2, 1968 disclose methods for producing compound II.

As examples of the 2-methyl-quinoxaline-di-N-oxides which can be used according to the invention as starting compounds, there are mentioned in particular:

2-methyl-3-carboxylic acidamido-quinoxaline-di-N-oxide-(1.4),
2-methyl-3-carboxylic acidmethylamido-quinoxaline-di-N-oxide-(1.4),
2,7-dimethyl-3-carboxylic acidmethylamido-quinoxaline-di-N-oxide-(1.4),
2-methyl-3-carboxylic acidbutylamido-7-chloro-quinoxaline-di-N-oxide-(1.4),
2-methyl-3-carboxylic acidpyrrolidylamido-7-methoxy-quinoxaline-di-N-oxide-(1.4),
2-methyl-3-carboxylic acid piperidylamido-7-ethoxy-quinoxaline-di-N-oxide-(1.4),
2-methyl-3-carboxylic acid-$\beta$-methoxy-ethylamido-quinoxaline-di-N-oxide-(1.4),
2-methyl-3-carboxylic acid dimethylamido-quinoxaline-di-N-oxide-(1.4).

Examples of suitable halogenating agents are sulphuryl chloride, bromine in gaseous or liquid form or dissolved in an organic diluent and, preferably, chlorine.

About one to about two moles of halogenating agent are used per mole of 2-methyl-3-carboxylic acid amido-quinoxaline-1,4-di-N-oxide.

Examples of suitable diluents are formic acid, glacial acetic acid and chlorinated hydrocarbons, e.g., methylene chloride, chloroform, carbon tetrachloride, perchloroethylene, chlorobenzene.

The halogenations are carried out in the temperature range of about 20° C. to about 120° C., preferably 60° C. to 100° C.

The new compounds of the invention are yellow crystalline substances, which can be isolated in the usual manner and, if necessary, be purified.

The antibacterial activity of the compounds of the present invention has been demonstrated both in vitro and in vivo and the compounds of the present invention have, in such tests, shown utility upon both subcutaneous as well as oral administration against acute bacterial infections. The compounds are effective against a range of both gram positive and gram negative bacteria.

The general dosage ranges of the compounds of the present invention are from about 5 mg. to about 300 mg. and preferably from about 20 mg. to about 100 mg./kg. per body weight per day. It is, however, to be appreciated that in some cases it may be necessary or desirable to administer a greater or lesser amount, which amount will be dependent upon the type of infection, the severity of the condition, the body weight of the human or animal involved, the past medical history and other factors generally taken into consideration by those administering antibacterial compounds. In the case where larger amounts are administered, it is generally advisable to divide these larger dosages into several smaller doses which may be administered during the course of the day.

The compounds of the present invention may be used either as such or may be administered in combination with known pharmaceutically acceptable carriers and diluents. Suitable as administration forms in combination with various inert carriers and diluents for the compounds of the present invention are tablets, capsules, powders, sprays, elixirs, aqueous suspensions, injectable solutions, syrups and the like. The carriers and diluents also include fillers and sterile aqueous media, as well as non-toxic organic solvents and other suitable pharmaceutical vehicles well known by those in the art. If desired, tablets, capsules or other forms used for oral administration may be provided with a sweetening additive or other suitable flavoring substance. The compounds of the present invention, which is the active ingredient in such a pharmaceutical composition, should be present in a concentration of from about 0.5 to about 90% by weight of the total composition.

For oral administration, tablets may also contain such known additives as sodium citrate, calcium carbonate, di-calcium phosphate, together with various adjuvants such as starch, preferably potato starch, and the like, and binders such as polyvinylpyrrolidine, gelatin and the like, lubricants such as magnesium stearate, sodium lauryl sulphate and talc may also be used for tablet-making. For aqueous suspensions and/or elixirs which are intended for oral administration, suitable substances to improve the taste, dyestuffs, emulsifiers and/or diluents, such as water, ethanol, propylene glycol, glycerol and the like, may be added.

For solutions intended for parenteral application, the compound of the present invention may be combined with sesame oil or arachis oil or aqueous propylene glycol or N,N-dimethyl formamide may be used, as well as sterile aqueous solutions when water soluble compounds are utilized. If necessary, such aqueous solutions can be buffered in known and customary manner and the liquid diluents should be rendered isotonic beforehand by the addition of the requisite amount of salt or glucose. Such aqueous solutions are particularly suitable for intravenous, intramuscular and intraperitoneal injections. Sterile aqueous media may be prepared in manners per se known in the art.

The following data shows the effectiveness of compounds selected as representative of the class as a whole and the number of the compounds tested corresponds to the example number. These tests demonstrate the effectiveness of representative species and the genus as a whole embraces compounds having antibacterial activity already indicated.

In the animal experiments with white mice, the intraperitoneally infected animals were treated subcutaneously or orally as follows:

(1) Administration in one dose, subcutaneously or orally, of 1000 mg., 500 mg., 200 mg., 100 mg., 50 mg., 25 mg., 12.5 mg. or 6.25 mg./kg. 15 minutes before or 90 minutes after infection.

(2) Administration in two (or three) doses of 6.25 mg., 12.5 mg., 25 mg., 50 mg. or 150 mg./kg. two hours before and five hours after infection.

(3) Administration in four doses of 50 mg. or 150 mg./kg. two hours before infection, shortly before infection, 3 hours, 5 hours and/or 21 hours and 29 hours after infection.

The bacteria used for infection were *E. coli*, Klebsiella, *Staphylococcus aureus*, *Diplococcus pneumoniae* or *Streptoccus pyogenes*, *Proteus mirabilic* and *Pseudomonas aeruginosa*. The $ED_{100}$ of the most effective compounds (e.g., 1, 16, 4, 11, 2) against *E. coli* C165 lies, in the case of administration in one dose, orally or subcutaneously, between 5 mg./kg. and 100 mg./kg.

The $DL_{50}$ lies in the dosage range of about 400 mg./kg. to about 1500 mg./kg. after oral administration in one dose to mice. The substances are thus relatively non-toxic since the relatively less well tolerated ones are distinguished by higher effectiveness and are, therefore, applied only in low dosage. Also in the case of treatment of rats with 60 mg./kg. orally twice daily over two weeks, the substances were well tolerated. In the case of acute ascending infections of the urinary tract of the rat (pyclonephritis), dosages of 2 x 15 mg./kg. daily, i.e., 15 mg./kg. twice a day, over 7–10 days were applied with success and were tolerated well. In vitro, the substances act bacteriostatically and bactericidally.

The new compounds are also effective against Mycoplasma infections in the in vitro test, amounts of about 5 to about 50$\gamma$ per ml. being used.

ANIMAL EXPERIMENTS WITH THE WHITE MOUSE
[Percent surviving animals 24 hours after infection]

| | Example— | | | | | | | | | | | |
|---|---|---|---|---|---|---|---|---|---|---|---|---|
| | 1 | 2 | 3 | 4 | 5 | 6 | 8 | 9 | 11 | 12 | 15 | 16 |
| Infection germ: | | | | | | | | | | | | |
| Dose, mg./kg. oral | 1 x 10 | 2 x 25 | 2 x 25 | 1 x 25 | 2 x 150 | 2 x 150 | | 2 x 50 | 1 x 25 | 2 x 25 | 1 x 100 | 1 x 8 |
| $E.\ coli$ | 100 | 100 | 100 | 100 | 100 | 100 | | 100 | 100 | 100 | | 100 |
| Dose, gm./kg. oral | 2 x 50 | 2 x 75 | 2 x 50 | 2 x 50 | | 3 x 150 | | 4 x 50 | 2 x 50 | 4 x 50 | 1 x 50 | 1 x 50 |
| $Staph\ aureus$ | 100 | 90 | 100 | 100 | | 100 | | 80 | 100 | 100 | 100 | 100 |
| Dose, mg./kg. oral | 2 x 150 | 2 x 150 | | | | | | | 4 x 150 | | | 4 x 50 |
| $Pseudomonas\ aerug$ | 100 | 100 | | | | | | | 90 | | | 80 |
| | Animal experiments with the rat | | | | | | | | | | | |
| Acute, ascending, infection of the urinary tract; Dose 2 x 15 mg./kg. oral over 7 days | (¹) | (¹) | | | | | | | | | | |

¹ Kidneys normal.

NOTE.—Control animals, severe pyelonephrites.

IN VITRO INHIBITION VALUES
[Minimum inhibition concentration in μg./ml. nutrient medium]

| | Example— | | | | | | | | | | | | |
|---|---|---|---|---|---|---|---|---|---|---|---|---|---|
| | 1 | 2 | 3 | 4 | 5 | 6 | 8 | 9 | 11 | 12 | 14 | 15 | 16 |
| Bacterium: | | | | | | | | | | | | | |
| $E.\ coli$ | 3-12 | 12-25 | 10-100 | 5-100 | 10-100 | 10 | >100 | 5-100 | 10-100 | 100>100 | 100 | >100 | 2 |
| $Psdm.\ aerug$ | 12-100 | 50 | 100 | 100 | >100 | 100 | >100 | 100 | 100 | >100 | >100 | >100 | 10 |
| $Prot.\ sp$ | 3 | 12-25 | 10 | 10 | 100 | 10 | 100 | 10 | 10-100 | 6-100 | 100 | 100 | 10 |
| $Klebs.\ sp$ | 1-6 | 12-50 | 10-100 | 10-100 | >100 | 10-100 | >100 | 10-100 | 100 | 3-100 | 100 | >100 | 5 |
| $Steph.\ aureus$ | 6 | 6-25 | 5 | 10 | 10 | 10 | 100 | 10 | 10 | 10 | 100 | 10 | 5 |
| $Strpt.\ pyog$ | 10 | 1 | 10 | 10 | >100 | 100 | 100 | 100 | 10 | 10 | 100 | 100 | 10 |
| Pneumococcus | ~50 | | | | | | | | | | | | |
| Salmonella | 0.5 | | | | | | | | | | | | |
| Noioccria | <0.5 | | | | | | | | | | | | |
| $Corynebacterium\ dipht.\ gravis$ | 1 | | | | | | | | | | | | |

NOTE.—The new 2-halomethyl-3-carboxylic acid amido-quinoxaline-di-N-oxides-(1.4) also show (same general dosage latitude as stated above) effectiveness against amoebae and flagellates ($E.\ histolytica$, $Trichomomas\ vaginalis$, $Lamblia\ muris$) in vitro as well as in vivo tests on animals (e.g. mice rats, golden hamsters).

| Example No. | Formula | Melting point in, °C. | Appearance |
|---|---|---|---|
| 1 | quinoxaline-di-N-oxide with —CO—NH—CH₃ and —CH₂—Cl substituents (4) | ¹ 195-196 | Pale-yellow crystals. |
| 2 | quinoxaline-di-N-oxide with —CO—NH—C₂H₅ and —CH₂—Cl substituents (5) | ⁴ 205 | Do. |
| 3 | quinoxaline-di-N-oxide with —CO—NH—C₃H₇ and —CH₂—Cl substituents (6) | 175 | Do. |
| 4 | quinoxaline-di-N-oxide with —CO—NH—CH(CH₃)₂ and —CH₂—Cl substituents (7) | 175 | Do. |

TABLE—Continued

| Example No. | Formula | Melting point in, °C. | Appearance |
|---|---|---|---|
| 5 | (8) quinoxaline-di-N-oxide, 2-CO-NH-C$_4$H$_9$, 3-CH$_2$-Cl | 131 | Pale-yellow crystals. |
| 6 | (9) quinoxaline-di-N-oxide, 2-CO-NH-C(CH$_3$)$_3$, 3-CH$_2$-Cl | 204 | Do. |
| 7 | (10) quinoxaline-di-N-oxide, 2-CO-NH-C$_{12}$H$_{25}$, 3-CH$_2$-Cl | 109 | Do. |
| 8 | (11) quinoxaline-di-N-oxide, 2-CO-NH-C$_6$H$_{11}$, 3-CH$_2$-Cl | 198 | Do. |
| 9 | (12) quinoxaline-di-N-oxide, 2-CO-NH-CH$_2$-CH$_2$-OCH$_3$, 3-CH$_2$-Cl | 155 | Do. |
| 10 | (13) quinoxaline-di-N-oxide, 2-CO-NH-CH$_2$-CH$_2$-O-CO-CH$_3$, 3-CH$_2$-Cl | 178 | Do. |
| 11 | (14) quinoxaline-di-N-oxide, 2-CO-N(CH$_3$)$_2$, 3-CH$_2$-Cl | 197 | Do. |
| 12 | (15) quinoxaline-di-N-oxide, 2-CO-N(C$_2$H$_5$)$_2$, 3-CH$_2$-Cl | 147 | Do. |
| 13 | (16) quinoxaline-di-N-oxide, 2-CO-N(pyrrolidinyl), 3-CH$_2$-Cl | 197 | Do. |

TABLE—Continued

| Example No. | Formula | Melting point in ° C. | Appearance |
|---|---|---|---|
| 14 | (17) 2-quinoxaline-di-N-oxide with CO—NH(piperidyl) and CH$_2$—Br substituents | 192 | Pale-yellow crystals. |
| 15 | (18) 2-quinoxaline-di-N-oxide with CO—NH(pyrrolidyl) and CH$_2$—Cl substituents | 165 | Do. |
| 16 | (19) 2-quinoxaline-di-N-oxide with CO—NH$_2$ and CH$_2$—Cl substituents | 230 | Do. |

[1] Decomposition.

The preparation of the compounds is illustrated by the following example:

(A) 233 g. (1 mole) 2-methyl-3-carboxylic acid methylamido-quinoxaline-di-N-oxide-(1.4) are dissolved in 700 ml. chloroform and heated to the boil. 90 g. (2.5 gram-atoms) of chlorine are introduced into the boiling mixture within 3 hours, with stirring. The starting material first dissolves, then the reaction product separates in crystalline form. Stirring is continued for 30 minutes at boiling temperature, and air is then blown through the reaction mixture for 30 minutes in order to remove the HCl which is formed; this is followed by cooling and suction filtration. After recrystallisation from ethanol/dioxan, 181 g. (=68% of the theory) of 2-chloromethyl-3-carboxylic acid methylamido-quinoxaline-di-N-oxide-(1.4) are obtained as yellow crystals which melt at 195–196° C.

To prepare the bromine compound, an analogous method of working is followed. The 2-methyl-3-carboxylic acid methylamido-quinoxaline-di-N-oxide-(1.4) used as starting compound for this purpose was obtained as follows:

300 g. (12 moles) methylamine are introduced into 2 l. of methanol which are cooled to —10° C. to 0° C. with Dry Ice; 830 ml. (10 moles) of freshly distilled diketene are then added dropwise at —10° C. to 0° C., with stirring, the temperature is allowed to come to room temperature and stirring is continued for a further 2 hours at 35° C. Into the obtained solution of acetoacetic acid methylamide are added portionwise 1360 g. (10 moles) benzofuroxan, and then about 30 moles of ammonia are introduced, the temperature of the reaction mixture being kept below 45° C. by occasional cooling. After subsidence of the reaction heat, heating to 40–45° C. is effected and stirring is continued for 6–8 hours. The reaction product separates in pale-yellow crystals. Cooling is effected, followed by suction filtration and washing out with methanol. 1709 g. (=73.3% of the theory) of 2-methyl-3-carboxylic methylamido - quinoxaline-di-N-oxide-(1.4) are obtained as pale-yellow crystals which, after recrystallisation from dimethyl formamide/methanol, melt at 214° C. with decomposition.

The other compounds, that is, those whose formulas are set forth as Examples 2 through 16 are prepared in a similar manner by reacting, respectively, 2-methyl-3-carboxylic acid-ethylamido-quinoxaline-di-N-oxide-1,4 with chlorine;

2-methyl-3-carboxylic acid-propylamido-quinoxaline-di-N-oxide-1,4 with chlorine;
2-methyl-3-carboxylic acid-isopropylamido-quinoxaline-di-N-oxide-1,4 with chlorine;
2-methyl-3-carboxylic acid-butylamido-quinoxaline-di-N-oxide-1,4 with chlorine;
2-methyl-3-carboxylic acid-tert.-butylamido-quinoxaline-di-N-oxide-1,4 with chlorine;
2-methyl-3-carboxylic acid-dodecylamido-quinoxaline-di-N-oxide-1,4 with chlorine;
2-methyl-3-carboxylic acid-cyclohexylamido-quinoxaline-di-N-oxide-1,4 with chlorine;
2-methyl-3-carboxylic acid-methoxyethylamido-quinoxaline-di-N-oxide-1,4 with chlorine;
2-methyl-3-carboxylic acid-acetoxyethylamido-quinoxaline-di-N-oxide-1,4 with chlorine;
2-methyl-3-carboxylic acid-dimethyl-amido-quinoxaline-di-N-oxide-1,4 with chlorine;
2-methyl-3-carboxylic acid-diethyl-amido-quinoxaline-di-N-oxide-1,4 with chlorine;
2-methyl-3-carboxylic acid-pyrrolidyl-amido-quinoxaline di-N-oxide-1,4 with chlorine;
2-methyl-3-carboxylic acid-pyrrolidyl-amido-quinoxaline-di-N-oxide-1,4 with bromine;
2-methyl-3-carboxylic acid-piperidyl-amido-quinoxaline-di-N-oxide-1,4 with chlorine;
2-methyl-3-carboxylic acid-amide-quinoxaline-di-N-oxide-1,4 with chlorine.

The starting materials set forth above may be obtained in a manner similar to that described with reference to the compound of Example 1 and as previously indicated, methods of production of such compounds are also described in German application F53665 IVd/12p filed Oct. 4, 1967 and corresponding United States application filed concurrently herewith and designated Le A 11052–A Ser. No. 764,611 filed Oct. 2, 1968.

The compounds of the present invention may also be produced by oxidizing quinoxalines of the formula:

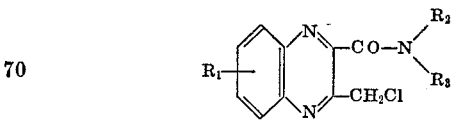

wherein R$_1$, R$_2$ and R$_3$ are as above defined. Hydrogen peroxide in the presence of glacial acetic acid or acetic anhydride is a preferred oxidizing agent. The oxidation can also be carried out with organic peracids, such as peracetic acid, perbenzoic acid, monoperphthalic acid and the like. When subsequently introducing the N-oxide oxygen, the work is carried out according to known methods (Houben-Weyl "Methoden der organischen Chemie," Volume XI./2, page 190 et sq. E. Ochial, Aromatic Amineoxides, Elsevier Publishing Comp., 1967).

In addition to the new compounds and processes disclosed herein, the present invention also includes pharmaceutical compositions containing at least one compound of the present invention in combination or admixture with a solid or liquid diluent or carrier, as well as methods of treating bacterial infections. The present invention also includes unit dosage forms comprising at least one compound of the present invention either alone or in admixture or combination with a solid or liquid diluent or carrier. The compound may be suitably enveloped by a protective covering containing the compound itself and, if used, a diluent or carrier.

The term "medicament in dosage unit form" as used in the present specification means a medicament as defined above in the form of discrete portions each containing a unit dose, or a multiple or sub-multiple of a unit dose of the active compound or compounds. Such portions may, for example, be in monolithic coherent form, such as tablets, suppositories, pills or dragees; in wrapped or concealed form, such as wrapped powders, cachets, sachets, or capsules; in ampoules, either free or as a sterile solution suitable for parenteral injection; or in any other form known to the art.

What is claimed is:

1. An antibacterial pharmaceutical composition which comprises an antibacterially effective amount of a compound of the formula:

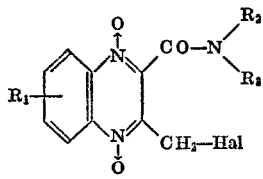

wherein $R_1$ is hydrogen, lower alkyl of 1 to 4 carbon atoms, lower alkoxy of 1 to 4 carbon atoms, or chlorine, $R_2$ is hydrogen, straight or branched chain alkyl of 1 to 12 carbon atoms, or straight or branched chain alkyl or 1 to 12 carbon atoms substituted by hydroxy, lower alkoxy of 1 to 4 carbon atoms, acyloxy of 1 to 4 carbon atoms, monoalkylamino of 1 to 4 carbon atoms in the alkyl portion, or dialkylamino of 1 to 4 carbon atoms in each alkyl portion, $R_3$ is hydrogen, straight or branched chain alkyl of 1 to 12 carbon atoms, straight or branched chain alkyl of 1 to 12 carbon atoms substituted by hydroxy, lower alkoxy of 1 to 4 carbon atoms, acyloxy of 1 to 4 carbon atoms in the alkyl portion, monoalkylamino of 1 to 4 carbon atoms in the alkyl portion, or dialkylamino of 1 to 4 carbon atoms in each alkyl portion, or when $R_2$ is hydrogen, cyclohexyl, or $R_2$ and $R_3$ together with the amide nitrogen atom form a pyrrolidyl or piperidyl ring, and Hal is chlorine or bromine, in combination with a pharmaceutically acceptable non-toxic inert diluent or carrier.

2. An antibacterial pharmaceutical composition according to claim 1, wherein the compound is of the formula:

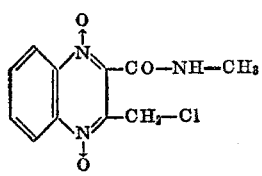

3. An antibacterial pharmaceutical composition according to claim 1, wherein the compound is of the formula:

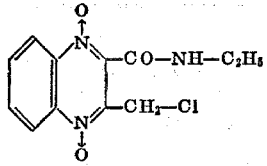

4. An antibacterial pharmaceutical composition according to claim 1, wherein the compound is of the formula:

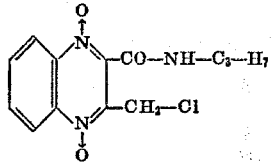

5. An antibacterial pharmaceutical composition according to claim 1, wherein the compound is of the formula:

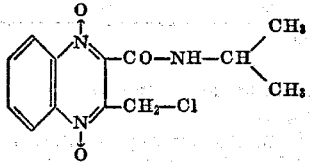

6. An antibacterial pharmaceutical composition according to claim 1, wherein the compound is of the formula:

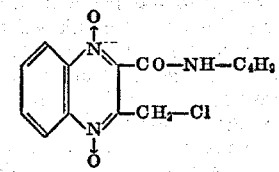

7. An antibacterial pharmaceutical composition according to claim 1, wherein the compound is of the formula:

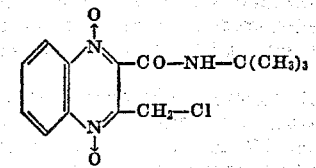

8. An antibacterial pharmaceutical composition according to claim 1, wherein the compound is of the formula:

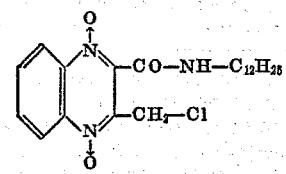

9. An antibacterial pharmaceutical composition according to claim 1, wherein the compound is of the formula:

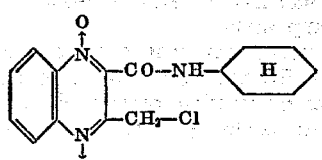

10. An antibacterial pharmaceutical composition according to claim 1, wherein the compound is of the formula:

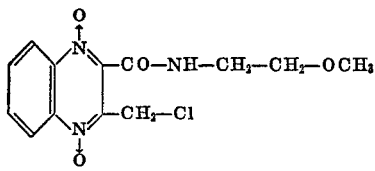

11. An antibacterial pharmaceutical composition according to claim 1, wherein the compound is of the formula:

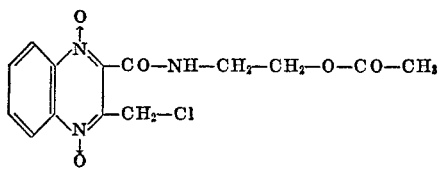

12. An antibacterial pharmaceutical composition according to claim 1, wherein the compound is of the formula:

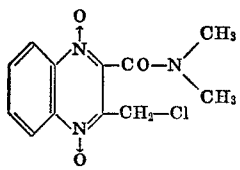

13. An antibacterial pharmaceutical composition according to claim 1, wherein the compound is of the formula:

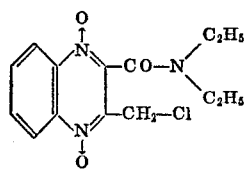

14. An antibacterial pharmaceutical composition according to claim 1, wherein the compound is of the formula:

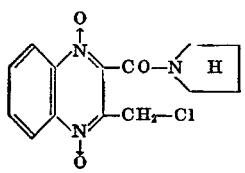

15. An antibacterial pharmaceutical composition according to claim 1, wherein the compound is of the formula:

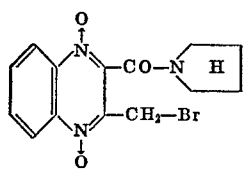

16. An antibacterial pharmaceutical composition according to claim 1, wherein the compound is of the formula:

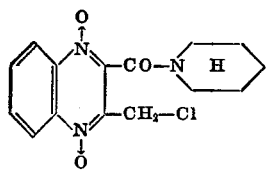

17. An antibacterial pharmaceutical composition according to claim 1, wherein the compound is of the formula:

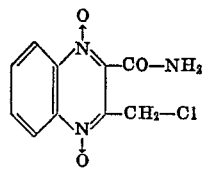

18. An antibacterial pharmaceutical composition according to claim 1 in oral administration form.

19. An antibacterial pharmaceutical composition according to claim 1 in parenteral administration form.

20. A method of treating bacterial infections in humans and animals which comprises administering to said human or animal an antibacterially effective amount of a compound of the formula:

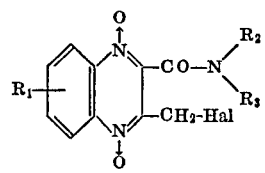

wherein $R_1$ is hydrogen, lower alkyl of 1 to 4 carbon atoms, lower alkoxy of 1 to 4 carbon atoms, or chlorine, $R_2$ is hydrogen, straight or branched chain alkyl of 1 to 12 carbon atoms, or straight or branched chain alkyl of 1 to 12 carbon atoms substituted by hydroxy, lower alkoxy of 1 to 4 carbon atoms, acyloxy of 1 to 4 carbon atoms, monoalkylamino of 1 to 4 carbon atoms in the alkyl portion, or dialkylamino of 1 to 4 carbon atoms in each alkyl part, $R_3$ is hydrogen, straight or branched chain alkyl of 1 to 12 carbon atoms, straight or branched chain alkyl of 1 to 12 carbon atoms substituted by hydroxy, lower alkoxy of 1 to 4 carbon atoms, acyloxy of 1 to 4 carbon atoms in the alkyl portion, monoalkylamino of 1 to 4 carbon atoms in the alkyl portion, or dialkylamino of 1 to 4 carbon atoms in each alkyl part, or when $R_2$ is hydrogen, cyclohexyl, or $R_2$ and $R_3$ together with the amide nitrogen atom form a pyrrolidyl or piperidyl ring, and Hal is chlorine or bromine, until amelioration of the condition occurs.

21. A method of treatment according to claim 20 wherein from 5 mg./kg. to 300 mg./kg. is administered.

22. A method of treatment according to claim 20, wherein the compound is of the formula:

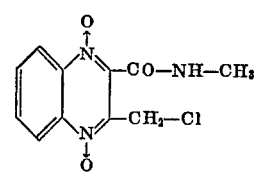

23. A method of treatment according to claim 20, wherein the compound is of the formula:

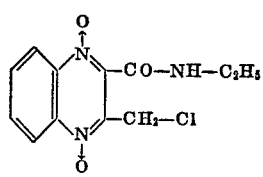

24. A method of treatment according to claim 20, wherein the compound is of the formula:

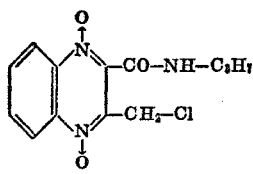

25. A method of treatment according to claim 20, wherein the compound is of the formula:

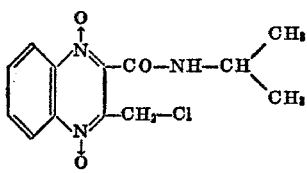

26. A method of treatment according to claim 20, wherein the compound is of the formula:

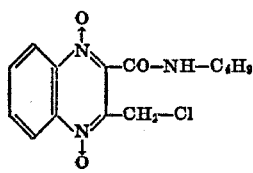

27. A method of treatment according to claim 20, wherein the compound is of the formula:

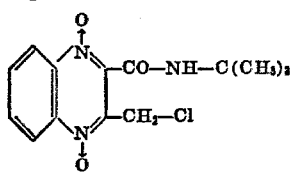

28. A method of treatment according to claim 20, wherein the compound is of the formula:

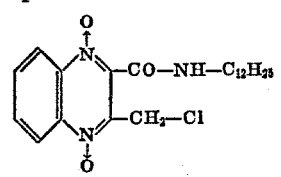

29. A method of treatment according to claim 20, wherein the compound is of the formula:

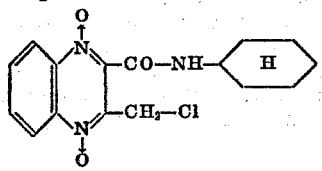

30. A method of treatment according to claim 20, wherein the compound is of the formula:

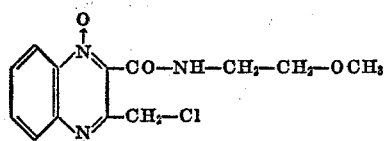

31. A method of treatment according to claim 20, wherein the compound is of the formula:

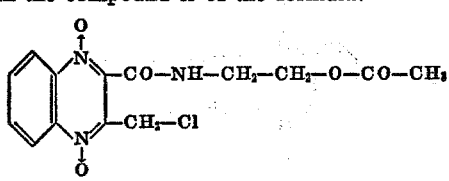

32. A method of treatment according to claim 20, wherein the compound is of the formula:

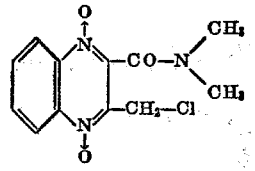

33. A method of treatment according to claim 20, wherein the compound is of the formula:

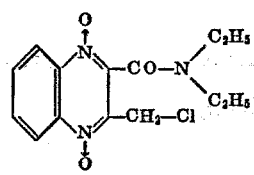

34. A method of treatment according to claim 20, wherein the compound is of the formula:

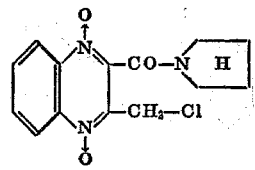

35. A method of treatment according to claim 20, wherein the compound is of the formula:

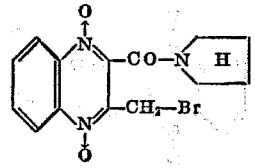

36. A method of treatment according to claim 20, wherein the compound is of the formula:

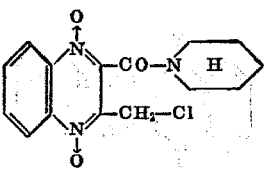

37. A method of treatment according to claim 20, wherein the compound is of the formula:

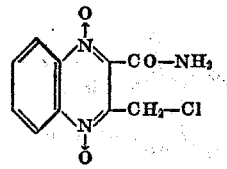

38. A method of treatment according to claim 20, wherein the administration is oral.

39. A method of treatment according to claim 20, wherein the administration is parenteral.

References Cited
UNITED STATES PATENTS

| | | | |
|---|---|---|---|
| 3,157,654 | 11/1964 | Sasse et al. | 260—250 |
| 3,398,141 | 8/1968 | Haddadin et al. | 260—250 |

JEROME D. GOLDBERG, Primary Examiner